(12) United States Patent
Tai et al.

(10) Patent No.: US 6,569,358 B1
(45) Date of Patent: May 27, 2003

(54) METHOD FOR INCORPORATING METAL NANOPARTICLES IN POROUS MATERIALS

(75) Inventors: Yutaka Tai, Aichi (JP); Koji Tajiri, Aichi (JP); Masao Watanabe, Aichi (JP); Sakae Tanemura, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 10/101,175

(22) Filed: Mar. 20, 2002

(30) Foreign Application Priority Data

Dec. 7, 2001 (JP) ..................................... 2001-374445

(51) Int. Cl.$^7$ .............................. B82B 1/00; B82B 3/00; H01B 1/02
(52) U.S. Cl. ..................... 252/512; 252/512; 252/513; 252/514; 75/343; 75/362; 75/392; 428/546; 428/550; 428/361; 428/370; 516/113; 516/198; 423/338; 423/625; 423/22; 423/23; 423/25
(58) Field of Search ................................. 252/512, 513, 252/514; 75/343, 362, 392; 428/546, 550, 361, 370; 516/113, 198; 423/338, 625, 22, 23, 25

(56) References Cited

FOREIGN PATENT DOCUMENTS

| JP | 59120249 | * | 7/1984 | ............ B01J/35/12 |
| JP | 63242348 | * | 10/1998 | ............ B01J/23/40 |
| JP | 2001089139 | * | 4/2001 | ............ C01G/1/02 |

OTHER PUBLICATIONS

Heinrichs et al, "Pd/SiO2–Cogelled Aerogel Catalysts and Impregnated Aerogel and Xerogel Catalysts: Synthesis and Characterization," J. Catal. 1997, 170, 366–376.*
Morris et al, "Silica Sol as a Nanoglue: Flexible Synthesis of Composite Aerogels," Science, 1999, 284, 622–624.*
Vijaya Sarathy et al, "Thiol–derivatized nanocrystalline arrays of Gold, Silver, and Platinum," J. Phys. Chem. 1997, B101, 9876–9880.*
Sun et al, "Synthesis of monodisperse cobalt nanocrystals and their assembly into magnetic superlattices," J. Appl. Phys. 1999, 85(8), 4325–4330.*
Brust et al, "Synthesis of Thiol–derivatied Gold Nanoparticles in a Two–phase Liquid–Liquid System," J. Chem. Soc., Chem. Commun., 1994, 801–802.*
B. Heinrichs, et al., Journal of Catalysis, vol. 170, pps. 366–376, "Pd/SiO$_2$–Cogelled Aerogel Catalysts and Impregnated Aerogel and Xerogel Catalysts: Synthesis and Characterization", 1997.
C. A. Morris, et al., Science, vol. 284, pps. 622–624, "Silica Sol As a Nanoglue: Flexible Synthesis of Composite Aerogels", Apr. 23, 1999.
Y. Tai, et al., Advanced Materials, vol. 13, No. 21, pps. 1611–1614, "Preparation of Gold Cluster/Silica Nanocomposite Aerogel Via Spontaneous Wet–Gel Formation", Nov. 2, 2001.
Chobiryusi to Cluster Kondankai, Dai–5–Kai Kenkyukai Koen–Ronbunshu, pps. 161–164, "Liquid Phase Synthesis of Thiol–Passivated Gold Cluster And The Formation of The Gold Cluster/Silica Nanocomposite", Jun. 7, 2001 (with English Abstract).

* cited by examiner

Primary Examiner—Yogendra N Gupta
Assistant Examiner—Kallambella Vijayakumar
(74) Attorney, Agent, or Firm—Oblon, Spivak, McClelland, Maier & Neustadt, P.C.

(57) ABSTRACT

The method of preparing the porous material incorporating ultrafine metal particles comprises the following steps: (1) preparing surface-protected ultrafine metal particles by reducing metal ions in the presence of molecules such as dodecanethiol molecules; (2) immersing a wet gel in a solution of the ultrafine metal particles, thus forming an ultrafine metal particle/wet gel composite in which the ultrafine metal particles are incorporated in the wet gel; and (3) drying the ultrafine metal particle/wet gel composite to form a porous body.

10 Claims, 4 Drawing Sheets

METHOD FOR INCORPORATING METAL NANOPARTICLES IN POROUS MATERIALS

BACKGROUND OF THE INVENTION

1. Field of the Invention

The present invention relates to a method of preparing a porous material incorporating ultrafine metal particles, and more particularly to a method of preparing a porous material incorporating ultrafine metal particles of diameter a few nanometers that can be used, for example, as a catalyst or a photonics material that uses a minute size effect, and to the porous material incorporating ultrafine metal particles prepared using the method.

2. Background of the Invention

Moreover, it is expected that materials in which ultrafine metal particles are dispersed through a transparent matrix should be usable as photonics materials that make use of the highly nonlinear third order optical properties characteristic of ultrafine particles. The method generally used to prepare such materials is to mix a metal salt into a solution of an alkoxide of silicon or the like, and precipitate out ultrafine particles during a matrix gelation process by heating and adding a reducing agent.

Conventionally, the method most commonly used to prepare a material in which ultrafine metal particles are incorporated in a porous material is to first prepare a porous body having a honeycomb shape or the like, then make this porous body come into contact with a solution containing metal ions, and then carry out heat treatment/reduction (reference: Koji Onishi, Shokubai—Sono Himitsu o Saguru—('Probing the Secrets of Catalysts'), Dainippon-tosho, 1987). However, with this method, the porous body must have sufficient strength so as not to be damaged by the metal-introducing process, and hence the surface area of the porous body per unit weight cannot be made very high, and thus the amount of metal that can be introduced is limited. As a result, the catalyst quantity per unit weight of the material cannot be made very high. Moreover, because the fine metal particles are produced through heat treatment/reduction, sintering occurs during the heat treatment, resulting in relatively large fine particles of diameter of the order of several microns.

Moving on, a method commonly used to disperse ultrafine metal particles of diameter a few nm to a few tens of nm through a support is to prepare the ultrafine metal particles in a gel (reference: ed. Ueno, Mizukami and Sodezawa, Kinzoku-Arukokishido o Mochiiru Shokubai Chosei ('Preparation of Catalysts using Metal Alkoxides'), ICP, 1993). In this method, a salt or complex of the metal that one wishes to incorporate is added to a solution of a metal alkoxide that acts as a precursor of the support, and then hydrolysis and gelation are carried out, followed by drying. Ultrafine metal particles are then precipitated out into the support by heating to a few hundred, or else instead of heating, the ultrafine particles are produced at room temperature by adding a reducing agent. By using this method, ultrafine metal particles can be supported at any desired proportion in a fine support network, but because the precipitation of the ultrafine metal particles occurs at the heat treatment/reduction stage after the gel has been dried, there is a problem that it is difficult to control the size of the particles; moreover, in the case of heat treatment, sintering of the particles occurs, and hence there is a problem that relatively large ultrafine particles are produced.

Ultrafine particles of a metal such as gold of diameter a few nm cannot exist as is in a solution, the air or the like, but rather agglomeration occurs. However, by adsorbing protective groups such as thiol groups onto the surfaces of the ultrafine metal particles, such agglomeration can be inhibited. Specifically, it is known that by reducing metal ions in chloroauric acid or the like in the presence of an alkylthiol or the like, the metal can be made to stably exist in the form of ultrafine particles of diameter a few nm. Moreover, by controlling the preparation conditions, it is possible to control the size of the ultrafine metal particles produced.

However, art for dispersing such ultrafine metal particles through a porous body in a form in which the surface-protecting groups such as thiol groups have been removed so that usage as a catalyst is possible, and art for dispersing such ultrafine metal particles through a transparent inorganic substance so that application to photonics elements is possible, has not yet been developed.

With the foregoing in view, the present inventors carried out assiduous studies with a goal of developing art for introducing ultrafine metal particles of diameter down to a few nm that have been pre-prepared with size control carried out into a porous inorganic material in any desired proportion without changing the size of the ultrafine particles. As a result, the present inventors discovered that this goal can be attained by immersing a wet gel in a solution of surface-protected ultrafine metal particles, drying the resulting ultrafine metal particle/wet gel composite, and heating the resulting dried body to remove the surface-protecting molecules. As a result, the present inventors arrived at the present invention.

SUMMARY OF THE INVENTION

A porous material incorporating ultrafine metal particles and a method of preparing the same are provided. The method of preparing the porous material incorporating ultrafine metal particles comprises the following steps: (1) preparing surface-protected ultrafine metal particles by reducing metal ions in the presence of molecules such as dodecanethiol molecules; (2) immersing a wet gel in a solution of the ultrafine metal particles, thus forming an ultrafine metal particle/wet gel composite in which the ultrafine metal particles are incorporated in the wet gel; and (3) drying the ultrafine metal particle/wet gel composite to form a porous body. Moreover, the surface-protecting molecules are subsequently removed by heating the porous body.

It is thus an object of the present invention to manufacture and provide an ultrafine metal particle/aerogel composite by preparing ultrafine metal particles using a liquid phase method, incorporating the ultrafine metal particles in a gel to produce an ultrafine metal particle/wet gel composite, and then drying the ultrafine metal particle/wet gel composite.

To solve the above problems, the present invention is constituted from the following technical means.

(1) A method of preparing a porous material incorporating ultrafine metal particles, comprising the steps of:

preparing surface-protected ultrafine metal particles by reducing metal ions in the presence of thiol groups or other surface-protecting groups;

immersing a wet gel in a solution of the ultrafine metal particles, thus forming an ultrafine metal particle/wet gel composite in which the ultrafine metal particles are incorporated in the wet gel; and drying the ultrafine metal particle/wet gel composite.

(2) The method of preparing a porous material incorporating ultrafine metal particles described in (1) above, wherein the metal is one or more selected from the group consisting of gold, silver, palladium and other noble metal, and iron, cobalt and other transition metal.

(3) The method of preparing a porous material incorporating ultrafine metal particles described in (1) above, wherein the ultrafine metal particles have a particle diameter of 1 to 20 nm.

(4) The method of preparing a porous material incorporating ultrafine metal particles described in (1) above, wherein the solvent in which the ultrafine metal particles are dissolved is toluene, hexane, and/or tetrahydrofuran.

(5) The method of preparing a porous material incorporating ultrafine metal particles described in (1) above, wherein the wet gel used is a silica wet gel or an alumina wet gel.

(6) The method of preparing a porous material incorporating ultrafine metal particles described in (1) above, wherein the ultrafine metal particle/wet gel composite is dried by natural drying or supercritical drying.

(7) A method of preparing a porous material incorporating ultrafine metal particles, comprising the step of heating the porous material prepared by the method described in (1) above to remove the surface-protecting molecules.

(8) A porous material supporting ultrafine metal particles, comprising an ultrafine metal particle/aerogel composite, prepared by the method as described in any of (1) to (7) above.

DESCRIPTION OF THE PREFERRED EMBODIMENTS

Figure 1:
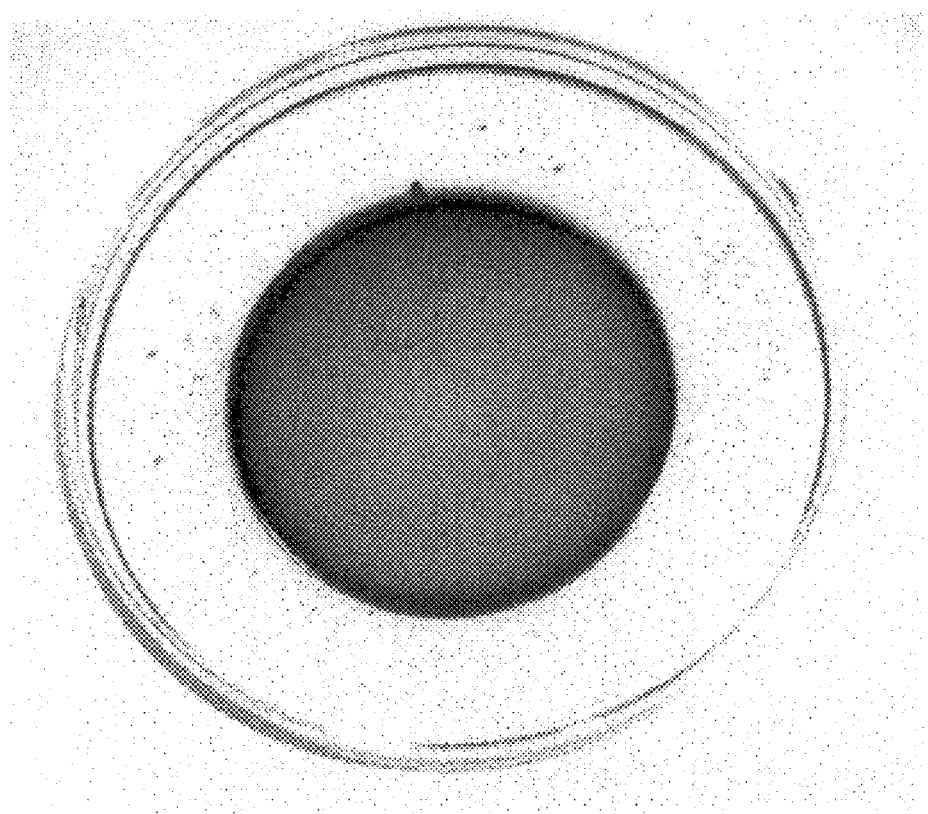
FIG. 1 is a photograph of a silica wet gel into which have been adsorbed ultrafine gold particles from toluene.

The present invention will now be described in more detail.

As described above, one of the constituent elements of the present invention comprises immersing a wet gel that will become the porous support in a solvent solution containing ultrafine metal particles that have been stabilized by adsorbing surface-protecting groups such as thiol groups onto the surfaces thereof, before the wet gel is immersed in the solvent solution, the liquid phase of the wet gel is replaced with the solvent of the solvent solution. As a result, because the ultrafine metal particles are stabilized, the ultrafine metal particles are adsorbed onto the inner surfaces of the wet gel spontaneously without undergoing any structural changes such as agglomeration. Control can be carried out by changing the concentration of the ultrafine metal particles introduced, the concentration of the ultrafine metal particles in the solution in which the wet gel is immersed, and the immersion time. Moreover, another constituent element of the present invention comprises carrying out natural drying or supercritical drying using liquefied carbon dioxide or the like of the wet gel into which the ultrafine metal particles have been adsorbed as described above. As a result, a material can be obtained in which the ultrafine metal particles are incorporated uniformly in a incorporating porous body, with agglomeration not taking place and hence the ultrafine metal particles having the same size as when initially introduced from the solvent solution. Furthermore, another constituent element of the present invention comprises heating the incorporating porous body thus obtained. As a result, the surface-protecting groups can be removed, thus obtaining a material in which the ultrafine metal particles are dispersed through the porous body in a form in which the surface-protecting molecules have been removed, while hardly changing the size of the metal cores of the ultrafine metal particles.

In the present invention, a noble metal such as gold, silver or palladium, or a transition metal such as iron and cobalt, is preferably used as the metal in the ultrafine metal particles. Moreover, as the 'surface-protecting groups such as thiol groups', a reagent suitable for stabilizing the ultrafine metal particles in the solvent solution is used, for example a thiol such as dodecanethiol or benzenethiol, or a phosphorus compound such as triphenylphosphine. The ultrafine metal particles and the stabilizing reagent are not limited to the examples given above, but rather other combinations of ultrafine metal particles and stabilizing reagent may be used so long as the metal is able to exist stably in the solvent solution without agglomerating. In the present invention, 'surface-protecting groups such as thiol groups' is thus defined to mean a reagent suitable for stabilizing the ultrafine metal particles in the solvent solution as described above. Moreover, ultrafine metal particles prepared using the method described above generally have a particle diameter of about 1 to 20 nm, but the particle diameter is not particularly limited to being in this range.

A silica wet gel, an alumina wet gel or the like can be used as the wet gel that becomes the incorporating porous body. Such a wet gel is generally prepared through hydrolysis of a metal alkoxide, for example methyl silicate or ethyl silicate in the case of a silica wet gel, and gelation. However, so long as a wet gel having a strength sufficient to withstand the solvent replacement described below and the like can be obtained, the material and method of preparing the wet gel are not limited to those above. Moreover, when preparing the wet gel, by diluting the metal alkoxide with an alcohol such as ethanol before carrying out the hydrolysis and gelation, wet gels of various metal oxide concentrations can be obtained. Depending on this and the drying method, porous bodies incorporating the ultrafine metal particles of various densities can be obtained.

The solvent used when adsorbing the ultrafine metal particles into the wet gel should be such that both the stabilized ultrafine metal particles and the wet gel can exist stably; examples include toluene, benzene, hexane, tetrahydrofuran and the like and mixtures thereof, and also mixtures of the above with insoluble solvents such as ethanol and acetonitrile.

The solvent in the liquid phase of the wet gel is replaced with a series of solvents, with each solvent being miscible with the last one, until the target solvent is reached. For example, in the case that the target solvent is toluene and the wet gel has been prepared through hydrolysis of a metal alkoxide and gelation, then because the liquid phase of the wet gel is initially a mixture of water and an alcohol such as ethanol, the liquid phase is first replaced with the pure alcohol, and then the pure alcohol is replaced with toluene. Each replacement of the liquid phase in the wet gel is carried out by repeating 2 to 3 times an operation in which the wet gel is immersed for 5 to 6 hours at room temperature in the pure solvent to be replaced with so that the old solvent is replaced with this new solvent. The immersion time and the number of solvent replacements should of course be changed as appropriate in accordance with the size of the wet gel.

The wet gel as described above is normally immersed in the solution containing the stabilized ultrafine metal particles for about 1 to 2 days at room temperature. With such an extent of immersion, the ultrafine metal particles in the solution are adsorbed onto the inner surfaces of the wet gel. Generally, the solution containing the ultrafine metal particles is colored, and the wet gel is colorless and translucent or almost transparent, and hence the progress of the reaction can be observed from the wet gel becoming colored and the solution becoming the original color of the solvent, for example colorless and transparent. By changing the concentration of the ultrafine metal particles in the solution, the immersion time, and the ratio of the amount of the solution to the amount of the wet gel, the concentration of the ultrafine metal particles in the porous body finally obtained can be changed.

The wet gel into which the ultrafine metal particles have been adsorbed is made into the porous body through natural drying or supercritical drying. Natural drying is generally carried out by leaving for a few days in the atmosphere at room temperature. However, so long as a dried porous body can be obtained, the method is not so limited; the conditions can be set variously in view of the solvent type and the prevention of shrinkage during drying, for example slight heating can be carried out or the drying can be carried out under reduced pressure.

Moreover, in the case that supercritical drying is used, in general a carbon dioxide medium is used, so that the temperature necessary for the drying can be made low. The wet gel into which the ultrafine metal particles have been adsorbed is put into an autoclave, the autoclave is filled with the solvent in the liquid phase of the wet gel, the liquid phase is replaced with liquefied carbon dioxide under pressure, the carbon dioxide is made to be a supercritical fluid under conditions above the critical conditions for carbon dioxide, for example 50 and 10 MPa, and then the carbon dioxide is removed while holding the temperature, thus obtaining the porous body. According to this method, a very low density porous body supporting ultrafine metal particles can be obtained. Note that the supercritical medium should be such that the temperature necessary for the drying is sufficiently low that sintering of the ultrafine metal particles does not occur, but is not limited to being carbon dioxide.

In the present invention, the surface-protecting molecules are removed by heating the porous material incorporating the ultrafine metal particles. The temperature at which the surface-protecting molecules desorb can be estimated form differential thermal analysis, thermogravimetric analysis or the like. The desorption of the surface-protecting molecules from the ultrafine metal particles in the porous material is achieved, for example, by carrying out heat treatment in an electric furnace for 1 hour at a temperature about 10 above the desorption temperature. Note, however, that so long as the heating apparatus, the temperature and the heating time are sufficient for desorption of the surface-protecting groups, the heating apparatus, the temperature and the heating time are not limited to being as above.

EXAMPLES

Specific examples of the present invention will now be described. It should be noted, however, that the present invention is not limited whatsoever by the following examples.

Example 1

(1) Preparation of Ultrafine Metal Particles 30 ml of a 30 mmol chloroauric acid aqueous solution and 80 ml of a 50 mmol tetraoctylammonium bromide toluene solution were mixed together, and agitation was carried out, thus extracting the chloroaurate ions into the toluene phase. The toluene phase was then separated off, 0.201 ml (0.842 mmol) of dodecanethiol was added thereto, and agitation was carried out for 3 to 4 hours. 1.25 ml of a 0.4 mol sodium borohydride aqueous solution was then instilled into the solution, and agitation was carried out for 3 to 4 hours, thus reducing the gold ions. The toluene phase was then separated off, and then the solution was concentrated down to about 10 ml, before being mixed with 400 ml of ethanol. The resulting mixed liquid was stored at −18, thus precipitating out ultrafine metal particles. The ultrafine metal particles thus produced were then purified twice by recrystallizing from the toluene-ethanol mixed liquid. The metal cores of the particles produced had a mean diameter of 2.6 nm. The half width of the particle diameter distribution was about 2 nm.

(2) Preparation of Wet Gel 51 g of tetramethyl silicate was mixed with 1078 of methanol, and agitation was carried out. 36 g of ammonia water was then added to the solution while continuing to agitate. The mole ratio of the tetramethyl silicate to the methanol to the water at this time was 1:10:6. After agitating for about 1 minute, the mixed liquid was poured into a cylindrical mold (diameter 40mm, depth 10 mm). The reaction liquid was left in the mold for about 1 hour, and after it had been verified that the reaction liquid had solidified into a jelly, the jelly was sealed with polyvinylidene chloride film to prevent drying out. The jelly was then left for 1 day, during which time gelation proceeded. The gel was then removed from the mold, and was immersed in ethanol and left for at least 1 day. To completely remove water and ammonia remaining in the gel, the ethanol was then subsequently replaced 2 times.

(3) Adsorption of Ultrafine Metal Particles into the Wet Gel

The solvent of the silica wet gel was replaced with 1:1 toluene-ethanol and then with toluene. To carry out the replacement completely, the silica wet gel was immersed in the 1:1 toluene-ethanol twice and then in toluene three times, with each immersion being carried out for at least 1 day.

The silica wet gel was then immersed in the toluene solution of the ultrafine metal particles (concentration: 3 mg/50 ml). After leaving for about 60 hours, the ultrafine gold particles in the solution had been completely adsorbed into the silica wet gel, thus forming the support. FIG. 1 shows a photograph of the wet gel support.

Example 2

The wet gel support produced by the method of Example 1 was subjected to supercritical drying using carbon dioxide, thus obtaining an aerogel support.

Subsequently, the wet gel support obtained as described above was put into an autoclave, and the autoclave was filled with toluene. To replace the liquid phase part of the gel with liquefied carbon dioxide gas (critical temperature 31.1, critical pressure 72.9 atmospheres), liquefied carbon dioxide gas was then injected into the autoclave while pressurizing with a pressurizing pump. Once the pressure had reached 90 atmospheres, the valve was adjusted to maintain this pressure, and the state was then held for 2 hours at 20. To carry out the replacement completely, this replacement operation was carried out 3 times. After the third replacement had been completed, the valve was closed, thus maintaining the pressure in the autoclave. The temperature in the autoclave was then increased, thus increasing the pressure to 100 atmospheres. The valve was then adjusted, thus holding the pressure. Once the temperature of the sample had exceeded 40, the carbon dioxide gas in the autoclave was released such that the pressure dropped at a rate of 1 atmosphere per minute.

Figure 2:
FIG. 2 is a TEM photograph of a silica aerogel incorporating ultrafine gold particles.

The diameter of the metal cores of the ultrafine particles in the aerogel support produced was about the same as before the ultrafine particles were supported in the gel. A TEM photograph of the aerogel support is shown in FIG. 2.

Figure 3:
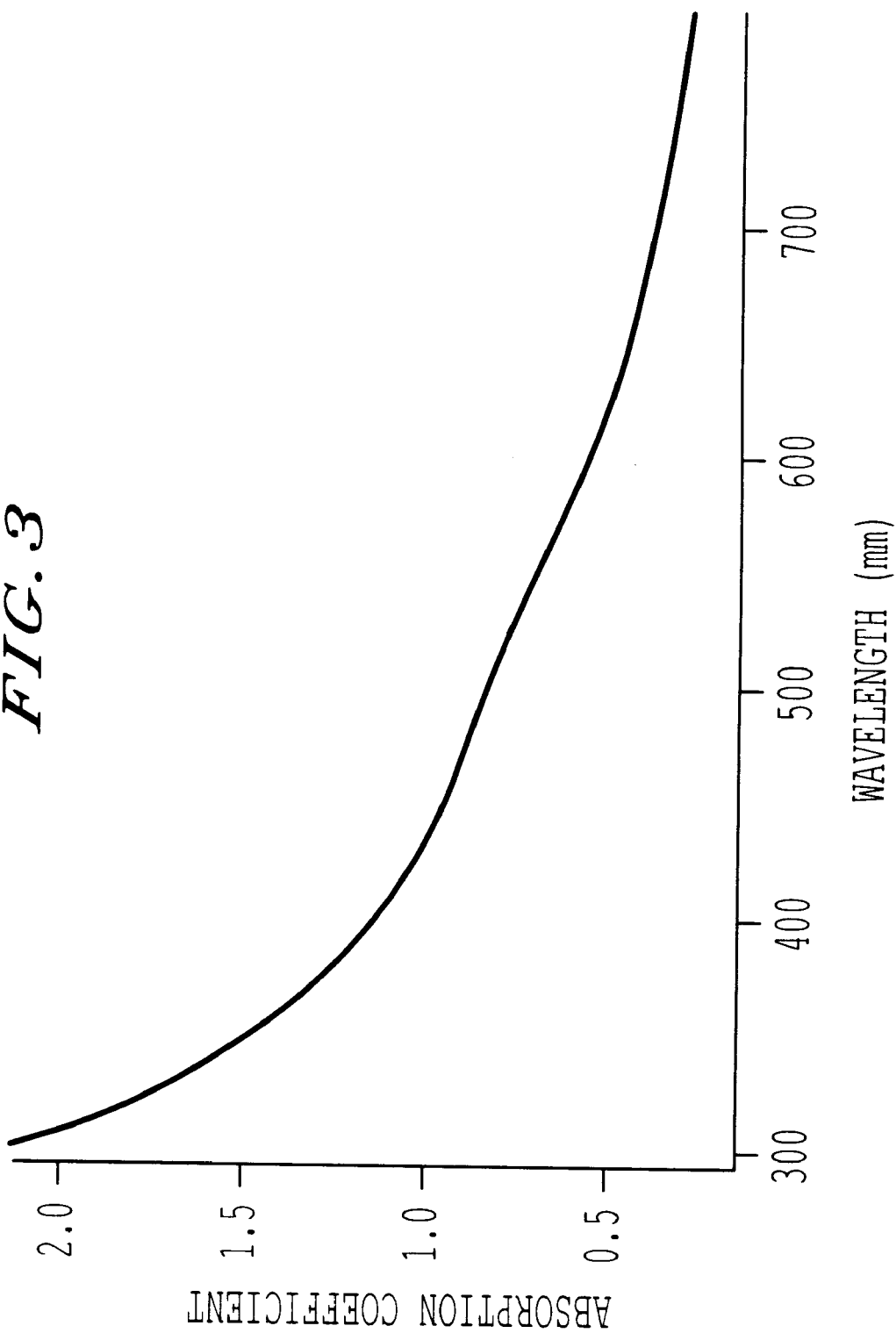
FIG. 3 shows the visible absorption spectrum of a silica aerogel incorporating ultrafine gold particles.

FIG. 3 shows the visible light absorption spectrum of an aerogel support obtained using the method of the present invention. It can be seen from the visible light absorption spectrum that the silica aerogel, which is originally transparent in the visible region, is colored by the ultrafine metal particles.

Example 3

Figure 4:
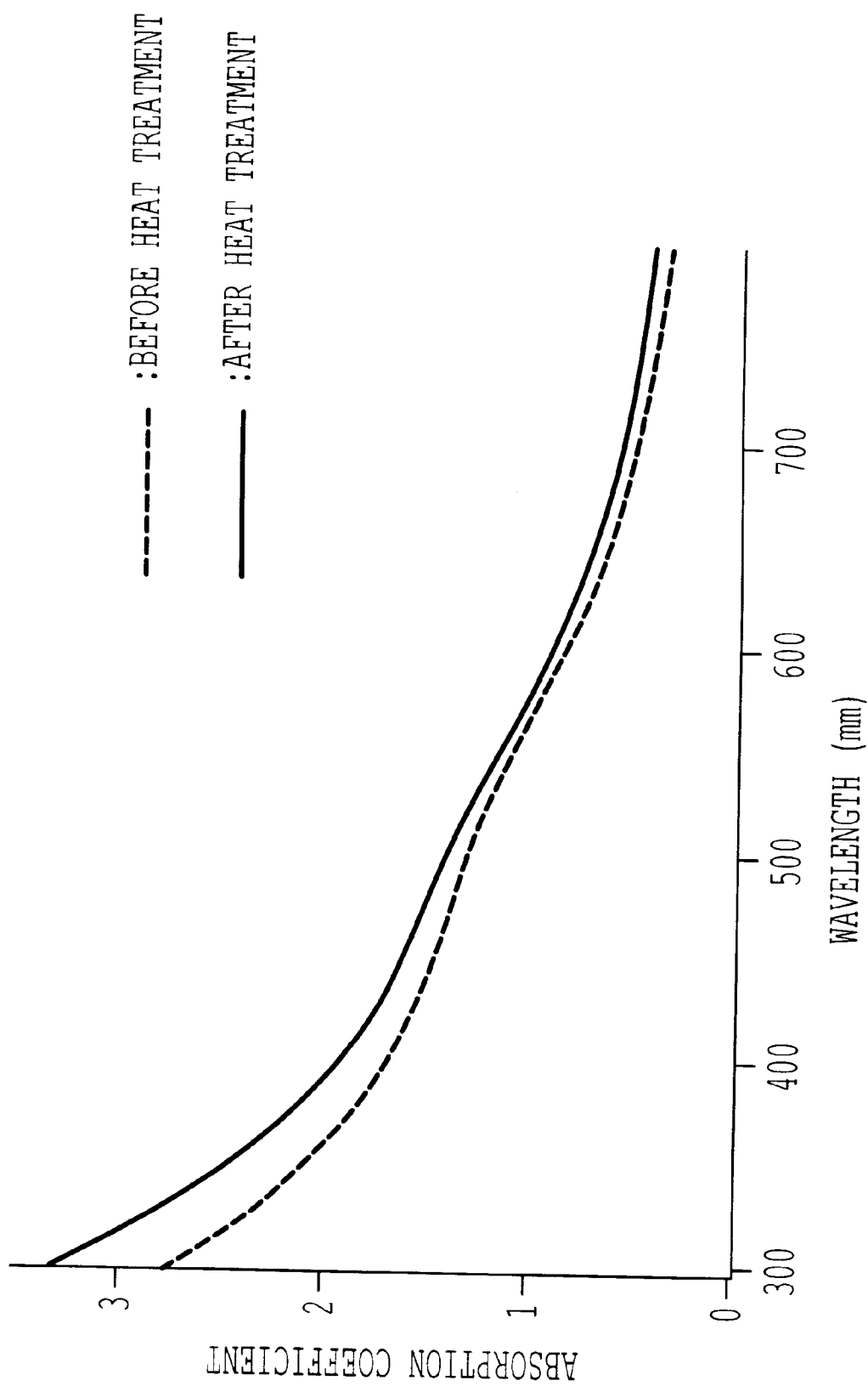
FIG. 4 shows the visible absorption spectra of a silica aerogel incorporating ultrafine gold particles before and after heat treatment.

When an aerogel support produced using the method of Example 2 above was subjected to thermal analysis, a weight loss corresponding to desorption of the thiol molecules was observed at about 290. Based on this data, such an aerogel support was heated for 1 hour at 300 in a nitrogen atmosphere (flow rate 20 ml/min). Visually inspecting the gel after the heating, there was no change in the color compared with before the heating, and moreover the visible light absorption spectra for before and after the heating were almost the same. It is thus thought that the heating causes hardly any change in the particle diameter. FIG. 4 shows the visible light absorption spectra of the silica aerogel incorporating the ultrafine metal particles before and after the heating.

As described above, the present invention relates to a porous material incorporating ultrafine metal particles and a method of preparing the same. According to the present invention, the following remarkable effects are produced: 1) Using pre-prepared ultrafine metal particles of diameter 2 to 3 nm, a porous body incorporating the ultrafine metal particles can be prepared, with the particle size of the ultrafine metal particles being maintained, and with it being possible to control the amount of the ultrafine metal particles incorporated. 2) Moreover, the ultrafine metal particles can be dispersed through the porous body in a form in which the surface-protecting molecules have been removed. 3) When using the porous body incorporating ultrafine metal particles as a catalyst or the like, because the size of the ultrafine metal particles in the porous body can be made small, the surface area of the ultrafine metal particles can be made large, and hence the catalytic efficiency can be improved. 4) Moreover, with ultrafine metal particles of size a few nm there is expected to be a quantum size effect, and hence it is anticipated that it will be possible to apply the porous body incorporating ultrafine metal particles to materials that use a quantum size effect such as nonlinear optical materials.

What is claimed is:

1. A method of preparing a porous material incorporating ultrafine metal particles, comprising the steps of:
   preparing surface-protected ultrafine metal particles by reducing metal ions in the presence of surface-protecting groups;
   immersing a wet gel in a solution of the ultrafine metal particles, thus forming an ultrafine metal particle/wet gel composite in which the ultrafine metal particles are incorporated in the wet gel; and
   drying the ultrafine metal particle/wet gel composite.

2. The method of preparing a porous material incorporating ultrafine metal particles according to claim 1, wherein the metal is one or more selected from the group consisting of gold, silver, palladium and other noble metal, and iron, cobalt and other transition metal.

3. The method of preparing a porous material incorporating ultrafine metal particles according to claim 1, wherein the ultrafine metal particles have a particle diameter of 1 to 20 nm.

4. The method of preparing a porous material incorporating ultrafine metal particles according to claim 1, wherein the solvent in which the ultrafine metal particles are dissolved is toluene, hexane, and/or tetrahydrofuran.

5. The method of preparing a porous material incorporating ultrafine metal particles according to claim 1, wherein the wet gel used is a silica wet gel or an alumina wet gel.

6. The method of preparing a porous material incorporating ultrafine metal particles according to claim 1, wherein the ultrafine metal particle/wet gel composite is dried by natural drying or supercritical drying.

7. The method of claim 1 wherein the surface-protecting groups comprise thiol groups.

8. The method of claim 1 wherein the surface-protecting groups comprise triphenylphosphine groups.

9. The method of claim 7, wherein the surface-protecting groups comprise thiol groups selected from the group consisting of dodecane thiol and benzene thiol.

10. A method of preparing a porous material incorporating ultrafine metal particles, comprising the step of heating the porous material prepared by the method defined in claim 1 to remove the surface-protecting molecules.

* * * * *